(12) United States Patent
Kim et al.

(10) Patent No.: US 11,961,957 B2
(45) Date of Patent: Apr. 16, 2024

(54) FLEXIBLE BATTERY AND METHOD FOR MANUFACTURING FLEXIBLE BATTERY

(71) Applicant: LIBEST INC., Daejeon (KR)

(72) Inventors: Joo Seong Kim, Daejeon (KR); Jin Hong Ha, Daejeon (KR); Gil Ju Lee, Daejeon (KR)

(73) Assignee: LIBEST INC., Daejeon (KR)

( * ) Notice: Subject to any disclaimer, the term of this patent is extended or adjusted under 35 U.S.C. 154(b) by 56 days.

(21) Appl. No.: 17/043,324

(22) PCT Filed: May 24, 2019

(86) PCT No.: PCT/KR2019/006248
§ 371 (c)(1),
(2) Date: Sep. 29, 2020

(87) PCT Pub. No.: WO2019/231176
PCT Pub. Date: Dec. 5, 2019

(65) Prior Publication Data
US 2021/0020894 A1 Jan. 21, 2021

(30) Foreign Application Priority Data
Jun. 1, 2018 (KR) .......... 10-2018-0063150

(51) Int. Cl.
*H01M 10/04* (2006.01)
*H01M 4/02* (2006.01)
(Continued)

(52) U.S. Cl.
CPC ......... *H01M 10/049* (2013.01); *H01M 4/366* (2013.01); *H01M 10/0585* (2013.01); *H01M 50/116* (2021.01); *H01M 50/50* (2021.01); *H01M 50/533* (2021.01); *H01M 2004/021* (2013.01)

(58) Field of Classification Search
CPC .. H01M 50/531; H01M 4/366; H01M 10/049; H01M 10/0585; H01M 50/116; H01M 2004/021; H01M 2220/30; H01M 10/0436; H01M 10/0459; H01M 10/052; H01M 10/0583; H01M 10/4235;
(Continued)

(56) References Cited

U.S. PATENT DOCUMENTS

2017/0214026 A1\* 7/2017 Ueda ............... H01M 50/536
2020/0235436 A1\* 7/2020 Kim ............... H01M 50/531

FOREIGN PATENT DOCUMENTS

| CN | 106575796 A | 4/2017 |
|---|---|---|
| JP | 2016004725 A | 1/2016 |

(Continued)

OTHER PUBLICATIONS

International Search Report (in English and in Korean) and Written Opinion issued in PCT/KR2019/006248, dated Sep. 2, 2019, 10 pages provided.

*Primary Examiner* — Matthew T Martin
*Assistant Examiner* — Bartholomew A Hornsby
(74) *Attorney, Agent, or Firm* — HSML P. C.

(57) ABSTRACT

A flexible battery includes an electrode group including a first electrode and a second electrode, a pair of electrode leads connected to the first electrode and the second electrode, respectively and a housing that accommodates the electrode group.

10 Claims, 6 Drawing Sheets

(51) Int. Cl.
*H01M 4/36* (2006.01)
*H01M 10/0585* (2010.01)
*H01M 50/116* (2021.01)
*H01M 50/50* (2021.01)
*H01M 50/533* (2021.01)

(58) Field of Classification Search
CPC .. H01M 50/105; H01M 50/136; H01M 50/50; H01M 50/533
See application file for complete search history.

(56) References Cited

FOREIGN PATENT DOCUMENTS

| | | | |
|---|---|---|---|
| JP | 2016072015 | A | 5/2016 |
| KR | 1020140035689 | A | 3/2014 |
| KR | 1020160090104 | A | 7/2016 |
| KR | 10-1783703 | B1 | 10/2017 |
| KR | 101789066 | B1 | 10/2017 |
| WO | 2016051645 | A1 | 4/2016 |

\* cited by examiner

FLEXIBLE BATTERY AND METHOD FOR MANUFACTURING FLEXIBLE BATTERY

TECHNICAL FIELD

The present disclosure relates to a flexible battery and a method for generating the flexible battery.

BACKGROUND

A secondary battery refers to a battery which can be charged and discharged, as opposed to a primary battery which cannot be charged, and has been widely used in the field of advanced electronic device fields such as cellular phone, notebook computer, camcorder, and the like.

Recently, attention has been focused on development and commercial availability of flexible devices such as flexible displays, wearable mobile phones and watches, and wearable personal computers. Therefore, a demand for flexibility of a secondary battery, which is a power supply device, is increasing.

Meanwhile, in a flexible environment, a casing may be broken by repeated bending and distortion and a short circuit may occur due to the misalignment and deviation of internal electrodes, which may cause the risk of ignition or explosion. Also, the precipitation of lithium may occur at the edges of an electrode.

Patent Document 1: Korean Patent Laid-open Publication No. 10-2016-0090104 (published on Jul. 29, 2016)

DISCLOSURE OF THE INVENTION

Problems to be Solved by the Invention

The present disclosure provides a flexible battery in which the shortest length of a first non-facing portion located at one end of an electrode group is designed to be equal to or greater than that of a second non-facing portion located at the other end of the electrode group, so that it is possible to suppress the precipitation of lithium and a short circuit in the flexible battery caused by an external force. The problems to be solved by the present disclosure are not limited to the above-described problems. There may be other problems to be solved by the present disclosure.

Means for Solving the Problems

To solve the above-described problem, a flexible battery according to a first aspect of the present disclosure includes: an electrode group including one or more first electrodes and one or more second electrodes having different polarities with a separator interposed therebetween; a pair of electrode leads connected to one of the first electrodes and one of the second electrodes, respectively; and a housing that accommodates the electrode group, and the pair of electrode leads are connected respectively to one of the first electrodes and one of the second electrodes at a first end of the electrode group, and the first electrode includes a first current collector and a first active material layer formed on the surface of the first current collector, and the second electrode includes a second current collector and a second active material layer formed on the surface of the second current collector, and the first active material layer has a first non-facing portion with respect to the second active material layer at the first end and a second non-facing portion with respect to the second active material layer at a second end opposite to the first end, and the shortest length of the first non-facing portion is equal to or greater than the shortest length of the second non-facing portion.

A method for generating a flexible battery according to a second aspect of the present disclosure includes: forming an electrode group including a first electrode and a second electrode; connecting a pair of electrode leads to the first electrode and the second electrode, respectively, at a first end of the electrode group; and accommodating the electrode group in a housing, and the first electrode includes a first current collector and a first active material layer formed on the surface of the first current collector, and the second electrode includes a second current collector and a second active material layer formed on the surface of the second current collector, and the first active material layer has a first non-facing portion with respect to the second active material layer at the first end and a second non-facing portion with respect to the second active material layer at a second end opposite to the first end, and the shortest length of the first non-facing portion is equal to or greater than the shortest length of the second non-facing portion.

The above-described aspects are provided by way of illustration only and should not be construed as liming the present disclosure. Besides the above-described exemplary embodiments, there may be additional exemplary embodiments described in the accompanying drawings and the detailed description.

Effects of the Invention

According to one of the aspects of the present disclosure, the present disclosure can provide a flexible battery in which the shortest length of a first non-facing portion located at one end of an electrode group is designed to be equal to or greater than that of a second non-facing portion located at the other end of the electrode group, so that it is possible to suppress a short circuit in the flexible battery caused by an external force.

Also, according to the present disclosure, the flexibility of the battery can be improved by using the shape and the stacked structure of an electrode equipped with an electrode lead connection tab and an electrode parallel connection tab, and the precipitation of lithium and a short circuit in the flexible battery caused by an external force can be suppressed, and, thus, the safety in use of the battery can be secured.

BEST MODE FOR CARRYING OUT THE INVENTION

Hereafter, embodiments will be described in detail with reference to the accompanying drawings so that the present disclosure may be readily implemented by a person with ordinary skill in the art. However, it is to be noted that the present disclosure is not limited to the embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected to" another element and an element being "electronically connected to" another element via another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Throughout the whole document, the term "unit" includes a unit implemented by hardware or software and a unit implemented by both of them. One unit may be implemented by two or more pieces of hardware, and two or more units may be implemented by one piece of hardware.

In the present specification, some of operations or functions described as being performed by a device may be performed by a server connected to the device. Likewise, some of operations or functions described as being performed by a server may be performed by a device connected to the server.

Hereinafter, the present disclosure will be explained in detail with reference to the accompanying configuration views or process flowchart.

Figure 1:
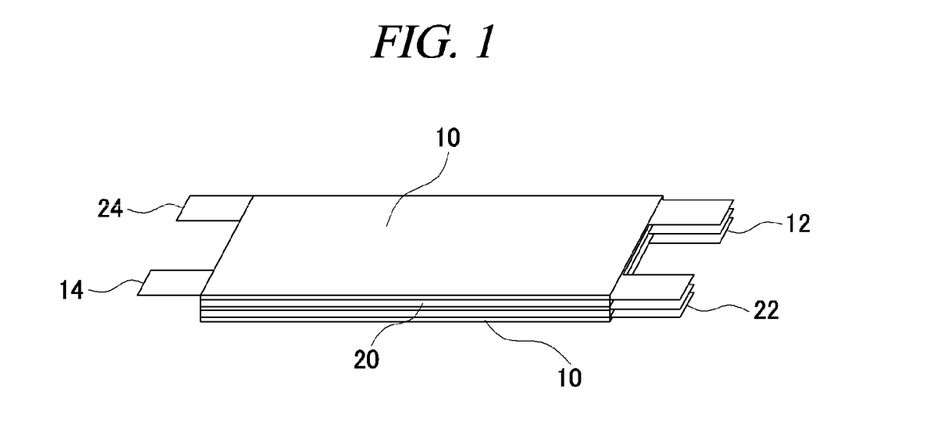
FIG. 1 is an illustration of an electrode group of a flexible battery according to an embodiment of the present disclosure.
Figure 2:
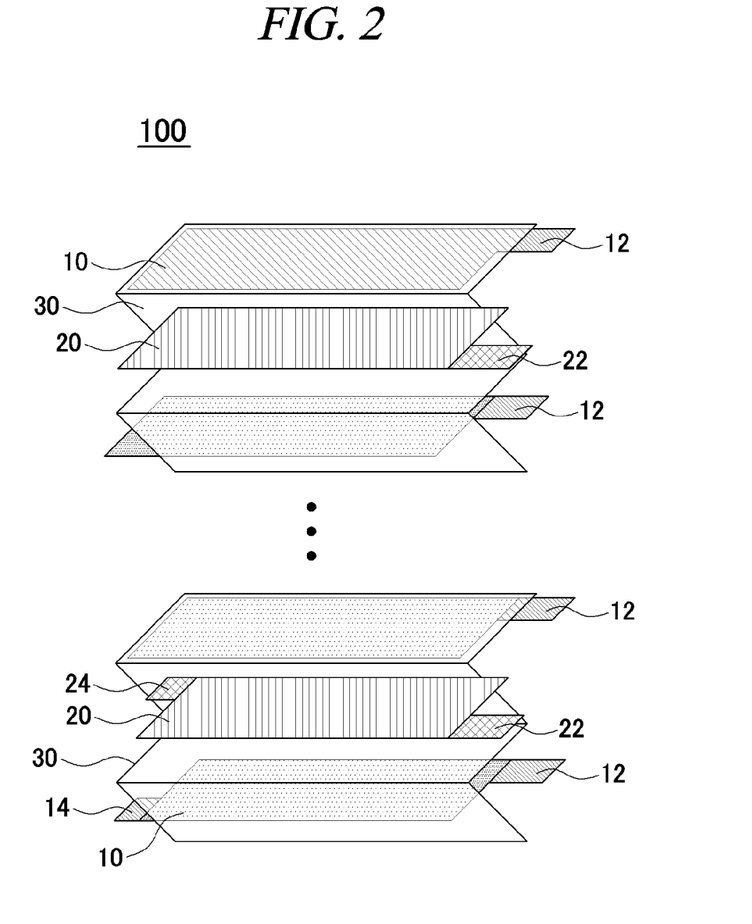
FIG. 2 and FIG. 3 are exploded views of an electrode of the flexible battery according to an embodiment of the present disclosure.
Figure 3:
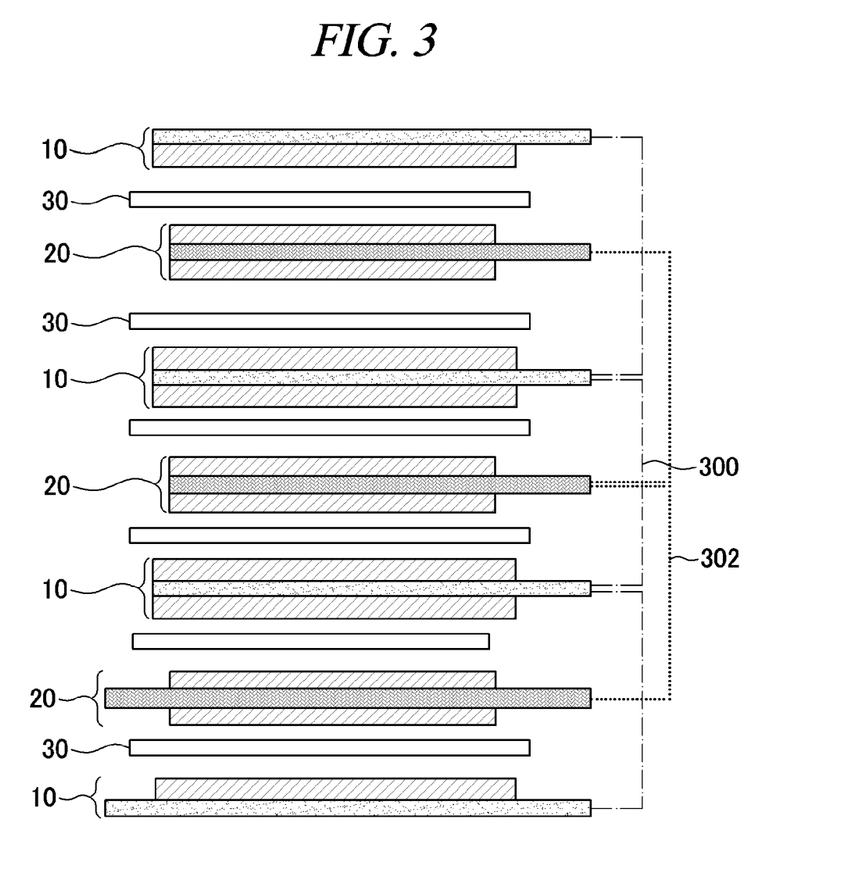

A flexible battery according to an embodiment of the present disclosure in which the shortest lengths of non-facing portions located at respective ends of an electrode group are designed to suppress the precipitation of lithium and improve the safety in use of the battery will be described with reference to FIG. 1 to FIG. 3.

A flexible battery may include an electrode group including, for example, three or more first electrodes 10 and three or more second electrodes 20 having different polarities with a separator 30 interposed therebetween, a pair of electrode lead connection tabs 14 and 24 provided at each of one of the first electrodes 10 and one of the second electrodes 20 in the electrode group, and a housing that accommodates the electrode group. For example, the first electrodes 10 may be positive electrode and the second electrodes 20 may be negative electrode.

The flexible battery may be electrically connected to electrode leads 16 and 26 exposed to the outside through the electrode lead connection tabs 14 and 24.

The electrode lead connection tabs 14 and 24 may be provided at the first electrode 10 and the second electrode 20, respectively, so as to be located at a first end (for example, left side in FIG. 1) of the electrode group. Specifically, the first electrode lead connection tab 14 may be provided at a first end of the first electrode 10 in the electrode group and the second electrode lead connection tab 24 may be provided at a first end of the second electrode 20 in the electrode group.

The electrode group may include a single first electrode 10 and a single second electrode 20 including the electrode lead connection tabs 14 and 24, respectively. For example, a single first electrode 10 including the first electrode lead connection tab 14 may be placed on an outermost region of the electrode group of the flexible battery and a single second electrode 20 including the second electrode lead connection tab 24 may be placed inside the single first electrode so as to entirely face the single first electrode.

Electrode parallel connection tabs 12 and 22 may be provided at a second end (for example, right side in FIG. 1) of the electrode group of the flexible battery. Specifically, the first electrode parallel connection tab 12 may be provided at a second end of the first electrode 10 in the electrode group and the second electrode parallel connection tab 22 may be provided at a second end of the second electrode 20 in the electrode group. The electrode lead connection tabs 14 and 24 and the electrode parallel connection tabs 12 and 22 may be located as shown in FIG. 1 to FIG. 3, but may not be limited thereto and their positions may be changed in a technically allowed range.

The electrode parallel connection tabs 12 and 22 provided at the second end of the electrode group may connect identical electrodes among the first electrodes 10 and the second electrodes 20 of the electrode group. For example, referring to FIG. 3, in the electrode group including one or more first electrodes 10 and one or more second electrodes 20, the first electrode parallel connection tabs 12 provided at second ends of the respective first electrodes 10 may electrically connect a plurality of first electrodes 10 as indicated by reference numeral 300 in FIG. 3, and the second electrode parallel connection tabs 22 provided at second ends of the respective second electrodes 20 may electrically connect a plurality of second electrodes 20 as indicated by reference numeral 302 in FIG. 3. That is, the plurality of first electrodes 10 and the plurality of second electrodes 20 may be electrically connected in parallel to each other through the electrode parallel connection tabs connected to the respective electrodes.

In the above-described electrode group, any one of the first electrodes 10 and any one of the second electrodes 20 may be equipped with the electrode lead connection tabs 14 and 24 and the electrode parallel connection tabs 12 and 22, respectively, to be apart from each other at both sides thereof. For example, in the electrode group of the flexible battery, each of a first electrode 10 placed on an outermost region and a second electrode 20 placed adjacent to and facing the first electrode 10 may be equipped with both an electrode lead connection tab and an electrode parallel connection tab. In other words, in the electrode group of the flexible battery, the first electrode placed on the outermost region may be equipped with both the first electrode lead connection tab 14 at a first end and the first electrode parallel connection tab 12 at a second end. Also, the second electrode 20 placed adjacent to and facing the first electrode 10 placed on the outermost region may be equipped with both the second electrode lead connection tab 24 at a first end and the second electrode parallel connection tab 22 at a second end.

In the electrode group, a plurality of first electrodes and a plurality of second electrodes are not joined to each other at the first end, but the identical electrodes are joined to each other at the second end by the electrode parallel connection tabs 12 and 22. That is, the electrode group is not fixed at the first end since the identical electrodes are not joined to each other, but fixed at the second end since the identical electrode are joined to each other by the electrode parallel connection tabs. Specifically, the plurality of first electrodes 10 and the plurality of second electrodes 20 of the electrode group are connected to each other by the electrode parallel connection tabs 12 and 22 at the second end, and, thus, the first electrodes and the second electrodes of the electrode group can be fixed to an outermost region of the electrode group by folding the electrode parallel connection tabs 12 and 22 180° at the second end. Therefore, if the flexible battery of the present disclosure is bent by an external force, the electrodes inside the flexible battery are more liable to be misaligned, deviated or the like at the first end than at the second end. To solve this problem, the present disclosure proposes a method of designing relative lengths of a first non-facing portion located at the first end of the flexible battery and a second non-facing portion located at the second end.

Figure 4A:
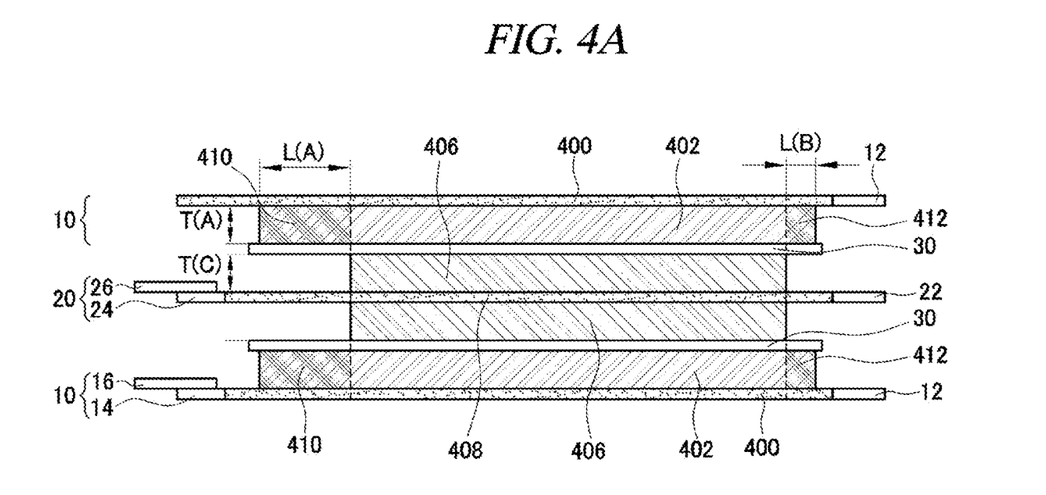
FIG. 4A and FIG. 4B are provided to explain the structure of the electrode group according to an embodiment of the present disclosure.
Figure 4B:
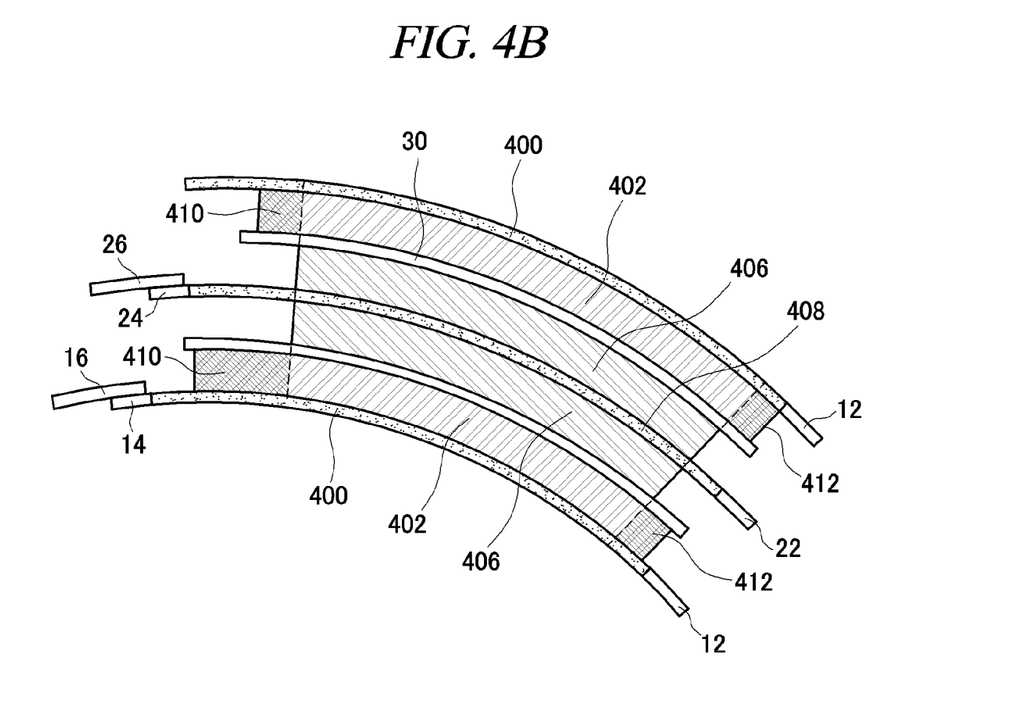
Figure 5:
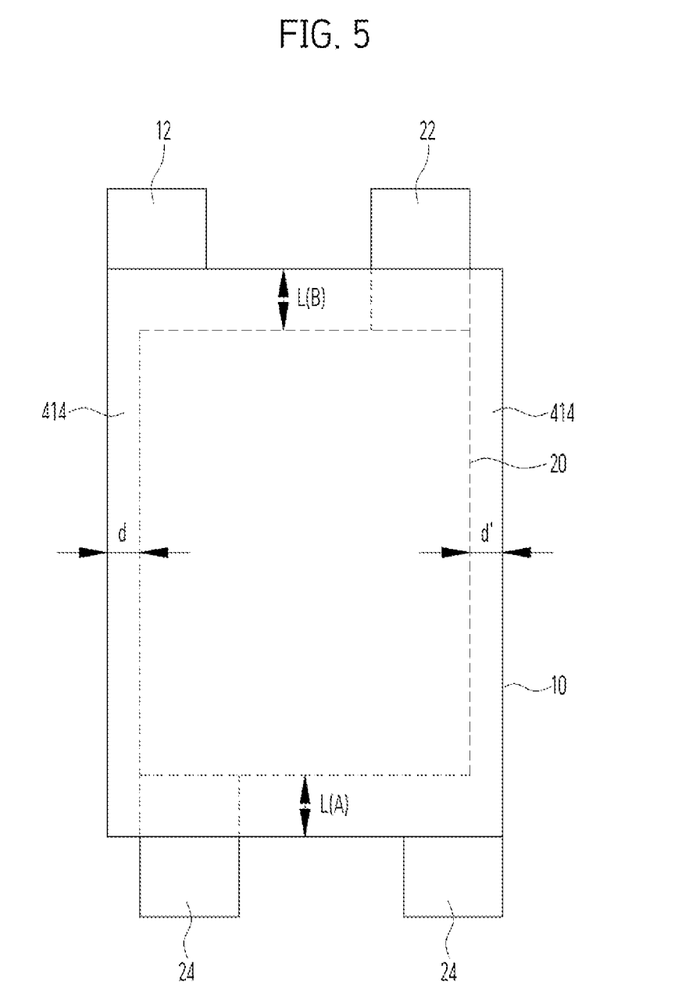
FIG. 5 is provided to explain conditions for generating the flexible battery according to an embodiment of the present disclosure.

FIG. 4A, FIG. 4B and FIG. 5 are provided to explain the structure of the electrode group and conditions for generating the flexible battery according to an embodiment of the present disclosure.

Referring to FIG. 4A to FIG. 5 together, the first electrode 10 may include a first current collector 400 and a first active material layer 402 formed on the surface of the first current collector 400. For example, the first active material layer 402 may contain an anode active material for lithium ions, and the anode active material may be selected from the group consisting of a carbon-based anode active material such as crystalline or amorphous carbon, carbon fiber or carbon composite, tin oxide, lithiumized compounds thereof, lithium, lithium alloy and mixtures thereof. However, the anode active material of the present disclosure is not limited thereto.

The second electrode 20 may include a second current collector 408 and a second active material layer 406 formed on both side surfaces of the second current collector 408. Herein, the second active material layer 406 may contain a cathode active material for lithium ions, and representative examples of the cathode active material may include lithium transition metal oxides such as $LiCoO_2$, $LiNiO_2$, $LiNiCoO_2$, $LiMnO_2$, $LiMn_2O_4$, $LiFePO4$, $V_2O_5$, $V_6O_{13}$ or $LiNi_{1-x-y}Co_xM_yO_2$ ($0 \leq x \leq 1$, $0 \leq 1$, $0 \leq x+y \leq 1$, M is a metal such as Al, Sr, Mg, La or the like). However, in the present disclosure, any cathode active material other than the above-described cathode active materials can also be used.

The first electrode 10 may be equipped with the first electrode lead connection tab 14 and the first electrode parallel connection tab 12. Specifically, in the first electrode 10 including the first current collector 400 and the first active material layer 402, portions of the first current collector 400 not coated with the first active material layer 402 may be defined as the first electrode lead connection tab 14 at the first end and the first electrode parallel connection tab 12 at the second end.

The second electrode 20 may be equipped with the second electrode lead connection tab 24 and the second electrode parallel connection tab 22. Specifically, in the second electrode 20 including the second current collector 408 and the second active material layer 406, portions of the second current collector 408 not coated with the second active material layer 406 may be defined as the second electrode lead connection tab 24 at the first end and the second electrode parallel connection tab 22 at the second end. In this case, the first active material layer 402 may be placed adjacent to and apart from the second active material layer 406.

That is, an electrode lead connection tab and an electrode parallel connection tab are provided as parts of a current collector of each electrode and may refer to portions not coated with an active material in a current collector of each electrode.

The flexible battery includes the first electrode 10, the second electrode 20 and an electrolyte that serves as an ion mediator and may further include the separator 30 that physically separates the first electrode 10 and the second electrode 20. For example, if the flexible battery includes a casing that houses the first electrode 10, the second electrode 20 and the separator 30, the electrolyte is injected into the casing during a production process of the flexible battery, so that the electrolyte can be located among the first electrode 10, the second electrode 20 and the separator 30. In this case, the separator 30 may serve to allow ions contained in an electrolytic solution corresponding to the electrolyte to pass therethrough.

Meanwhile, a thickness T(A) of the first active material layer 402 may be designed to be greater than a thickness T(C) of the second active material layer 406, or the area of the first active material layer 402 may be designed to be greater than the area of the second active material layer 406 placed adjacent to and facing the first active material layer 402. The thickness of an electrode in the flexible battery is flexibly determined depending on the kind and thickness of a current collector and an N/P ratio of the first active material layer 402 and the second active material layer 406. Also, the thickness of the active material layer may vary depending on material characteristics, such as particle size, density and pH, and a composition ratio of an active material and a conductive material.

For example, the area (or thickness) of the first active material layer 402 coated on the surface of the first current collector 400 of the first electrode 10 may be designed to be greater than the area (or thickness) of the second active material layer 406 coated on the surface of the second current collector 408 of the second electrode 20 placed adjacent to and facing the first electrode 10.

As such, the thickness T(A) (or area) of the first active material layer 402 is designed to be greater than the thickness T(C) (or area) of the second active material layer 406, and, thus, it is possible to suppress the precipitation of lithium in the first electrode 10 and improve the safety in use of the battery.

The electrode lead connection tabs 14 and 24 may be joined in part to the electrode leads 16 and 26 on upper surfaces or lower surfaces at the ends of the electrode lead connection tabs 14 and 24. Specifically, in a state where the electrode leads 16 and 26 are placed in parallel to parts of the electrode lead connection tabs 14 and 24, parts of the electrode leads 16 and 26 may be welded to parts of the electrode lead connection tabs 14 and 24 so as to overlap each other.

The first active material layer 402 of the first electrode 10 may have a first non-facing portion 410 with respect to the second active material layer 406 at the first end and a second non-facing portion 412 with respect to the second active material layer 406 at the second end opposite to the first end. Herein, a shortest length L(A) of the first non-facing portion 410 may be designed to be equal to or greater than a shortest length L(B) of the second non-facing portion 412.

As for a conventional flexible battery, an external force for bending, distortion or the like is repeatedly applied. In this case, the edges of the first electrode 10 and the second electrode 20 exposed to an external space between the casing and the electrode group rather than the inside of the electrode group are liable to be misaligned, and when the first electrode 10 and the second electrode are misaligned, the precipitation of lithium may occur. Also, due to the precipitation of lithium, the capacity and efficiency of the flexible battery may deteriorate. As a result, due to the growth of the precipitated lithium, the separator 30 may be damaged. Therefore, a short circuit may occur in the flexible battery and the safety of the flexible battery may deteriorate.

To solve this problem, the present disclosure provides the flexible battery in which the shortest length L(A) of the first non-facing portion 410 is designed to be equal to or greater than the shortest length L(B) of the second non-facing portion 412 in a (initial) state where an external force is not applied, and, thus, when an external force is applied to the flexible battery, a short circuit caused by the deviation of internal components of the battery and the misalignment between the first electrode 10 and the second electrode 20 and the precipitation of lithium can be suppressed. Particularly, in the flexible battery of the present disclosure, the precipitation of an internal material of the flexible battery caused by the misalignment, deviation or the like of the internal electrodes is more liable to occur at the first end of the electrode group which is not fixed than at the second end of the electrode group which is fixed by the joint between the electrode parallel connection tabs 12 and 22 and 180° folding of the joint portion. Therefore, the present disclosure attempts to generate a flexible battery by designing the length of the first non-facing portion 410 to be equal to or greater than the length of the second non-facing portion 412 at the first end where the precipitation of an internal material is liable to occur.

Suppose the first end and the second end of the flexible battery of the present disclosure are bent downwards by an external force as shown in FIG. 4B. In this case, the electrodes are fixed at the second end of the flexible battery by the electrode parallel connection tabs 12 and 22, and, thus, even if the flexible battery is bent, the second non-facing portion 412 may not shorten in length but may remain constant. However, the electrodes are not fixed at the first non-facing portion 410 of the flexible battery, and, thus, as the flexible battery is bent, the first non-facing portion 410 may shorten in length. Also, as the flexible battery is further bent, the first non-facing portion 410 gradually disappears and the second active material layer 406 of the second electrode 20 is exposed to the outside, and, thus, the precipitation of lithium may occur. To suppress this problem, in the present disclosure, the length of the first non-facing portion 410 at the first end may be designed to be equal to or greater than that of the second non-facing portion 412 at the first end.

In an embodiment of the present disclosure, if the shortest length L(A) of the first non-facing portion 410 is greater than the shortest length L(B) of the second non-facing portion 412, the electrode group of the flexible battery is fixed at the second end by the electrode parallel connection tabs 12 and 22. Thus, even if the flexible battery is bent, the misalignment, deviation or the like of the internal electrodes is not liable to occur at the second end. However, at the first end of the electrode group where these problem are liable to occur, it is possible to suppress the exposure of the second electrode 20 or the second active material layer 406 of the second electrode 20 to the outside of the first electrode 10 by the first non-facing portion 410 which is set to be equal to or greater than a predetermined threshold value. For example, the predetermined threshold value is a minimum threshold length at which the second active material layer of the second electrode is not exposed to the outside of the first active material layer of the first electrode by the radius of curvature when the flexible battery of the present disclosure is bent, and may be about 0.1 mm. Therefore, it is possible to suppress the precipitation of lithium and improve the performance and safety of the flexible batter.

That is, as shown in FIG. 4B, if the flexible battery is bent at a constant radius of curvature, the first non-facing portion 410 shortens in length as it gets farther from the center of curvature. In view of the forgoing descriptions, to suppress the exposure of the second electrode 20 to the outside of the first electrode 10 when the flexible battery is bent, the first non-facing portion 410 can be designed to remain equal to or greater than the predetermined threshold value even if the first non-facing portion 410 shortens in length.

In the above-described example and another embodiment of the present disclosure, if the shortest length L(A) of the first non-facing portion 410 is equal to the shortest length L(B) of the second non-facing portion 412, the shortest length L(A) of the first non-facing portion 410 and the shortest length L(B) of the second non-facing portion 412 may be designed to be equal to or greater than a predetermined length value.

In regard to the shortest length L(A) of the first non-facing portion 410, the shortest length L(B) of the second non-facing portion 412 and the predetermined length value, the first active material layer 402 may have third non-facing portions 414 with respect to the second active material layer 406 at both sides of the electrode group. The third non-facing portions 414 refer to not the both ends of the electrode group, but regions corresponding to the widths between the first electrode 10 and the second electrode 20. Referring to FIG. 5, the shortest length L(A) of the first non-facing portion 410 and the shortest length L(B) of the second non-facing portion 412 may be designed to be equal to or greater than shortest lengths d and d' of the third non-facing portions 414. That is, the predetermined length value may be set/designed to a value corresponding to the shortest lengths d and d' of the third non-facing portions 414. If the shortest lengths d and d' of the third non-facing portions 414 are designed to be greater than the shortest length L(A) of the first non-facing portion 410 and the shortest length L(B) of the second non-facing portion 412, the capacity of the flexible battery may be lost as much as the area corresponding to the length. Therefore, in the present disclosure, the shortest length L(A) of the first non-facing portion 410 and the shortest length L(B) of the second non-facing portion 412 are designed to be equal to greater than the shortest lengths d and d' of the third non-facing portions 414, and, thus, it is possible to minimize capacity loss of the flexible battery. Meanwhile, when the first electrode 10 and the second electrode 20 of the flexible battery are stacked, the shortest lengths d and d' of the third non-facing portions 414 at the both sides of the electrode group may be designed to be identical to or different from each other.

Figure 6:
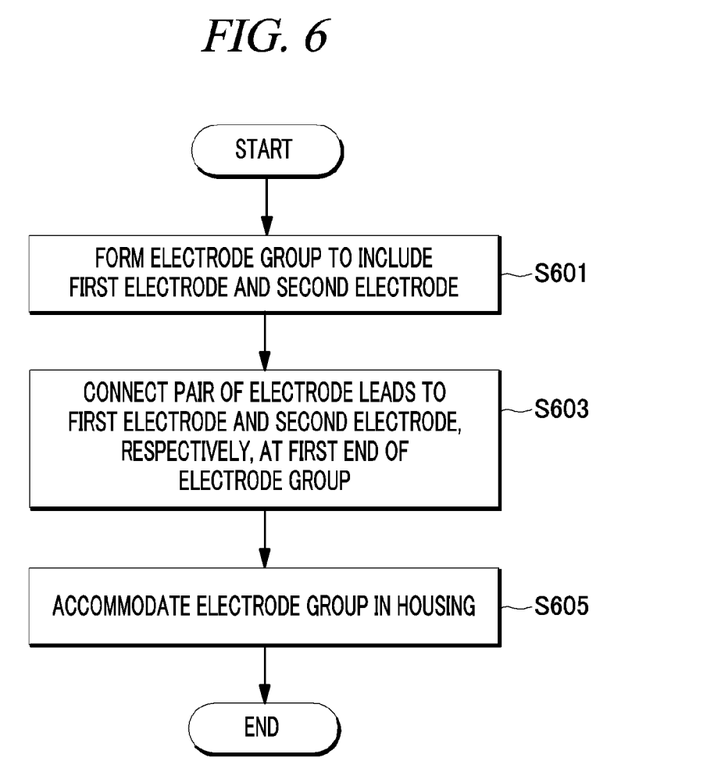
FIG. 6 is a flowchart showing a method for generating a flexible battery according to an embodiment of the present disclosure.

FIG. 6 is a flowchart showing a method for generating a flexible battery according to an embodiment of the present disclosure.

Referring to FIG. 6, an electrode group may be formed to include a first electrode 10 and a second electrode 20 in a process S601. Herein, the first electrode 10 may include a first current collector 400 and a first active material layer 402 formed on the surface of the first current collector 400, and the second electrode 20 may include a second current collector 408 and a second active material layer 406 formed on the second current collector 408. The first active material layer 402 may have a first non-facing portion 410 with respect to the second active material layer 406 at a first end and a second non-facing portion 412 with respect to the second active material layer 406 at a second end opposite to the first end.

A pair of electrode leads 16 and 26 may be connected to the first electrode 10 and the second electrode 20, respectively, at a first end of the electrode group in a process S603.

The electrode group may be accommodated in a housing in a process S605.

Although not shown in the drawing, a process of designing the shortest length of the first non-facing portion 410 to be equal to or greater than the shortest length of the second non-facing portion 412 may be further performed in the present disclosure.

In the descriptions above, the processes S601 to S605 may be divided into additional processes or combined into fewer processes depending on an embodiment of the present disclosure. In addition, some of the processes may be omitted and the sequence of the processes may be changed if necessary.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A flexible battery, comprising:
an electrode group including a first electrode and a second electrode;
a pair of electrode leads connected to the first electrode and the second electrode, respectively;
electrode parallel connection tabs configured to connect the first electrode and the second electrode to identical electrodes, respectively, in the electrode group, to fix one end of the electrode group; and
a housing that accommodates the electrode group, wherein
the electrode leads are connected to the first electrode and the second electrode, respectively, at a first end of the electrode group,
the first electrode includes a first current collector and a first active material layer formed on the surface of the first current collector and the second electrode includes a second current collector and a second active material layer formed on the surface of the second current collector,
the first active material layer has a first non-facing portion with respect to the second active material layer at the first end and a second non-facing portion with respect to the second active material layer at a second end opposite to the first end,
a shortest length of the first non-facing portion is equal to or greater than a shortest length of the second non-facing portion located at the second end, which is fixed by the electrode parallel connection tabs in a state where the flexible battery is not bent or where an external force is not applied, and
the first electrode includes an electrode lead connection tab connected to one of the electrode leads at the first end and one of the electrode parallel connection tabs at the second end.

2. The flexible battery of claim 1, wherein the electrode group is not fixed at the first end and is fixed at the second end by the electrode parallel connection tabs.

3. The flexible battery of claim 2, wherein the first non-facing portion shortens in length when the flexible battery is bent.

4. The flexible battery of claim 3, wherein the first non-facing portion is configured such that the shortest length remains equal to or greater than a predetermined threshold length value even if the first non-facing portion shortens in length due to bending of the flexible battery.

5. The flexible battery of claim 1, wherein a thickness of the first active material layer is greater than that of the second active material layer.

6. The flexible battery of claim 1, wherein a area of the first active material layer is greater than that of the second active material layer.

7. The flexible battery of claim 1, wherein the shortest length of the first non-facing portion is equal to or greater than 0.1 mm.

8. A flexible battery, comprising:
an electrode group including a first electrode and a second electrode;
a pair of electrode leads connected to the first electrode and the second electrode, respectively;
electrode parallel connection tabs configured to connect the first electrode and the second electrode to identical electrodes, respectively, in the electrode group, to fix one end of the electrode group; and
a housing that accommodates the electrode group, wherein
the electrode leads are connected to the first electrode and the second electrode, respectively, at a first end of the electrode group,
the first electrode includes a first current collector and a first active material layer formed on the surface of the first current collector and the second electrode includes a second current collector and a second active material layer formed on the surface of the second current collector,
the first active material layer has a first non-facing portion with respect to the second active material layer at the first end and a second non-facing portion with respect to the second active material layer at a second end opposite to the first end,
a shortest length of the first non-facing portion is equal to or greater than a shortest length of the second non-facing portion located at the second end, which is fixed by the electrode parallel connection tabs in a state where the flexible battery is not bent or where an external force is not applied, and
the first electrode includes an electrode lead connection tab connected to one of the electrode leads at the first end and one of the electrode parallel connection tabs at the second end.

9. The flexible battery of claim 1, wherein the first active material layer has third non-facing portions with respect to the second active material layer at both sides of the electrode group in a direction crossing between the first end and the second end of the electrode group.

10. The flexible battery of claim 9, wherein a shortest length of the first non-facing portion and a shortest length of the second non-facing portion are equal to or greater than shortest lengths of the third non-facing portions.

* * * * *